United States Patent [19]
Couperus et al.

[11] 3,910,405
[45] Oct. 7, 1975

[54] CONVEYOR APPARATUS

[75] Inventors: Egbert Couperus, Belleville; Anthony D. Janitsch, Carrying Place, both of Canada

[73] Assignee: Borg-Warner (Canada) Ltd., Oakville, Canada

[22] Filed: July 15, 1974

[21] Appl. No.: 488,398

Related U.S. Application Data
[63] Continuation of Ser. No. 368,420, June 8, 1973, abandoned.

[52] U.S. Cl. ............... 198/163; 198/165; 198/198; 198/201
[51] Int. Cl.² ........................................ B65G 15/14
[58] Field of Search .......... 198/163, 165, 193, 197, 198/198, 201

[56] References Cited
UNITED STATES PATENTS

| | | | |
|---|---|---|---|
| 2,642,178 | 6/1953 | Naylor | 198/165 |
| 2,711,816 | 6/1955 | Reno | 198/201 |
| 2,966,254 | 12/1960 | Kaiser | 198/165 |
| 2,978,095 | 4/1961 | Jenike | 198/165 |
| 3,319,776 | 5/1967 | Bechtloff et al. | 198/165 |
| 3,618,746 | 11/1971 | Suloff | 198/165 |
| 3,805,946 | 4/1974 | Yateman et al. | 198/165 |

FOREIGN PATENTS OR APPLICATIONS

| | | | |
|---|---|---|---|
| 713,552 | 9/1966 | Italy | 198/165 |
| 832,117 | 2/1952 | Germany | 198/165 |
| 944,102 | 12/1963 | United Kingdom | 198/165 |

Primary Examiner—Evon C. Blunk
Assistant Examiner—Jeffrey V. Nase
Attorney, Agent, or Firm—Robert B. Benson

[57] ABSTRACT

A belt elevator for elevating loose bulk material from one level to another, comprises a pair of cooperating endless belt conveyors whose forward runs are juxtaposed to face one another with an edge of one in sealing engagement with the other, the material being retained therebetween. A first belt conveyor is provided with raised edges which engage and seal with the edges of the other. The first conveyor is also provided with generally evenly spaced transversely positioned cleats or raised portions which, together with the raised edges, forms pockets to contain material being elevated. The stiffness of the first belt conveyor is greater than that of the second belt conveyor. The second belt conveyor is troughed at the entry portion for receiving the material to be elevated which material is discharged from the first belt conveyor at a discharge point at the higher level. The belts are maintained in tension to insure edge engagement and the retention of material therebetween.

1 Claim, 8 Drawing Figures

CONVEYOR APPARATUS

This is a continuation, of application Ser. No. 368,420, filed June 8, 1973 and now abandoned.

REFERENCE TO RELATED APPLICATIONS

This invention is an improvement over the apparatus described and claimed in copending application, Ser. No. 158,197, filed June 30, 1971 refiled as a continuation Ser. No. 359,381 on May 11, 1973 and now issued as U.S. Pat. No. 3,805,946 and assigned to the assignee of this application.

BACKGROUND OF THE INVENTIONS

Elevating equipment currently used in self-unloading ships may be of the bucket elevator type or the belt conveyor type. The former type of equipment is expensive to install, and suffers from the disadvantage of providing a surging rather than a continuous flow of material at the discharge point. The latter type of equipment necessarily occupies a great deal of space because the inclination of a conventional belt elevator is restricted to a maximum angle of about 18°; moreover, it is generally necessary to provide a number of transfer points at which material is transferred from one belt to another, and this frequently results in a high degree of degradation of the material.

THE INVENTION

The present invention comprises a belt conveyor apparatus for elevating material from one level to another, which apparatus is particularly suitable for elevating loose bulk material, eliminates the need for multiple transfer points, and occupies considerably less space than would be necessary for a conventional belt or bucket elevator system.

One of the belt conveyors is provided with raised longitudinal edge portions and transversely positioned cross cleats or raised portions to be able to handle fine granular material which has a tendency to aerate, without substantial spilling and without flushing of the material between the belts, i.e. when the height of the column of material exceeds the internal friction of the material resulting in movement of the material downwardly between the belts.

Apparatus in accordance with the invention comprises a pair of endless belt conveyors, identified as inner and outer belt conveyors, the forward runs of which aree juxtaposed in face-to-face edge sealing relation to define a tubular carrier wherein the material is clamped between the belts. The outer belt conveyor includes a troughed, substantially horizontal, upwardly facing entry portion, an upwardly inclined, downwardly facing terminal portion, and a concavely curved intermediate portion. The inner belt conveyor includes a downwardly facing entry portion defining with the entry portion of the first conveyor a bight between the conveyors, and upwardly inclined, upwardly facing terminal portion, and a convex intermediate portion. The inner belt conveyor is stiffer than the outer belt conveyor and has raised longitudinal edges and transverse or cross cleats preferably arranged in a V or herringbone pattern. The cross cleats with the raised belt edges forms pockets for the material being elevated. The cleats are slightly shorted in height than the edges, to insure that the raised edges contact the outer belt with sufficient pressure to effect the edge seal between the belts.

It will be appreciated that the clamping or mutually hugging action of the belts removes the limitation of the steepness of inclination which is characteristic of conventional belt elevators. In the system according to this invention, material is initially conveyed horizontally, then upwardly along a curved path towards and past a vertical position, and then on towards the discharge point at the higher level.

THE DRAWINGS

A conveyor apparatus in accordance with this invention will now be described, by way of example, with reference to the accompanying diagrammatic drawing.

DETAILED DESCRIPTION

Figure 1:
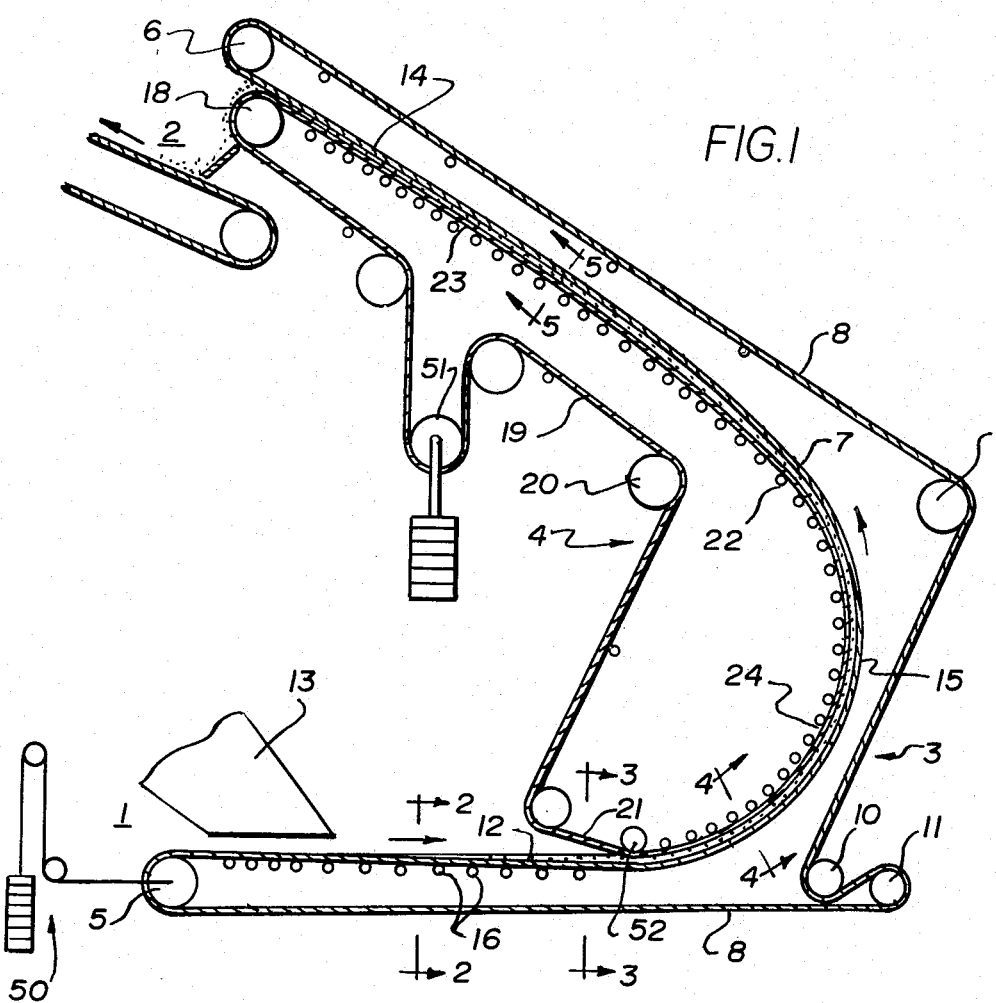
FIG. 1 is a partial sectional side view of the apparatus.

Referring to the drawings the depicted apparatus is designed for conveying loose bulk material from a first level 1 to a higher level 2, and comprises a first or inner endless belt conveyor 4 and a second or outer cooperating endless belt conveyor 3. The belt conveyor 3 is a conventional belt of substantially uniform thickness and extends between supporting pulleys 5 and 6 which are disposed at the lower and higher levels, respectively, and provide a forward run 7 and a return run 8. The belt conveyor 3 passes round a main bend pulley 9, a snub pulley 10, and a main drive pulley 11 as well as the supporting pulleys 5 and 6. The forward run of the belt conveyor 3 includes a substantially horizontal, upwardly facing entry portion 12, onto which the material is fed from a hopper 13, an upwardly inclined downwardly facing terminal portion 14, and a concavely curved intermediate portion 15. The entry portion 12, which need not be absolutely horizontal but can be inclined at an angle of up to about 18°, is supported on troughing rollers 16, see for example, FIG. 2.

In order to compensate for belt stretch and to maintain the belt conveyor 3 under tension at all times, the supporting pulley is connected to an automatic tensioning device 50 which applies a constant horizontal force to the pulley.

The inner belt conveyor 4, which is stiffer than the outer belt conveyor 3, extends between supporting pulleys 17 and 18 disposed at the lower and higher levels respectively, to provide a forward run in juxtaposed face-to-face relation with a forward run of the outer belt conveyor 3, and a return run 19. The return run 19 passes over a take up pulley 20, and in order to compensate for belt stretch and to maintain the belt conveyor 4 under tension at all times the return run of the conveyor is connected to an automatic tensioning device 51 which applies a constant tensioning force to the belt.

The forward run of the conveyor 4 includes a short, downwardly facing, entry portion 21, which defines with the entry portion 12 of the belt conveyor 3, a bight through which the material passes between the belts to be clamped thereby. The belt conveyor 4 passes over an impact idler 52 to minimize wear on the belt. The greater part of the forward run of the belt 4 is supported by a series of rollers 22, so as to follow a convex curve having an upwardly inclined terminal portion 23 of large radius and an intermediate portion 24 of small radius. It will be noted that the material-engaging surface of the belt 4 passes from a downwardly facing configuration at the entry portion 21 to an upwardly facing configuration at the terminal portion 23.

The inner belt conveyor 4 is provided with longitudinal raised edge portions 26, 26 and also cross or transverse cleats 27 substantially evenly spaced along the surface of the belt 4. The cleats 27 are shorter in height than the edges 26, to insure that the edge portions 26, 26 seal with the edges of the belt 3. The transverse cleats 27 may, as illustrated be disposed in a herringbone pattern. The cleats can be straight and merely across the belt, if desired.

It has been found that in order to achieve the most effective edge to edge seal between the raised edges of the belt and the belt 3, the belt 4 must be stiffer, i.e., have a higher cross sectional moment of inertia and/or modulus of elasticity than the belt 3 and also the spacing of the rollers 22 should be between eight and fourteen inches, preferably about twelve inches.

A typical belt 4 is 42 inches wide with raised edge portions 2.5 inches high and with a base 2.75 inches wide being tapered as illustrated, so that the top is defined by a 0.75 inch radius. A typical cross cleat is 2.25 inches high and 2.0 inches wide at the base, tapering at the top defined by a radius of 0.50 inch. With this typical belt, the belt 3, has a width of 42 inches. The moment of inertia of belt 4 is between 10 and 13 inches$^4$ and the moment of inertia of belt 3 is between 0.3 inches$^4$ and 0.5 inches$^4$. This arrangement is capable of elevating 900 tons of cement at 87.5 lbs/cu. ft. per hour. This example is for purposes of description; other belts can be used without departing from the spirit of the invention.

Figure 2:
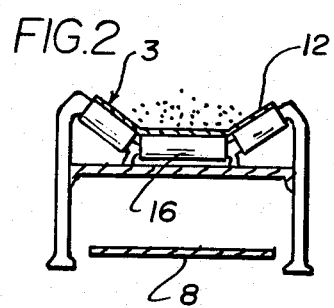
FIG. 2 is a section on line 2—2 in FIG. 1.
Figure 3:
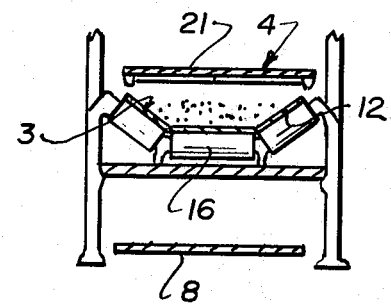
FIG. 3 is a section on line 3—3 in FIG. 1.
Figure 4:
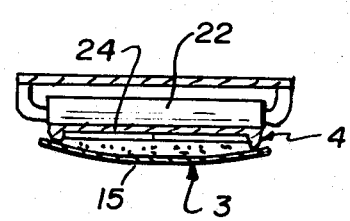
FIG. 4 is a section on line 4—4 in FIG. 1.
Figure 5:
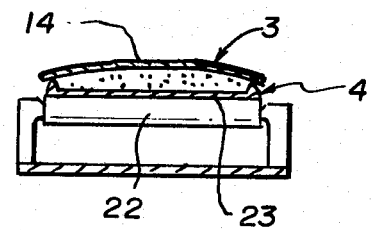
FIG. 5 is a section on line 5—5 in FIG. 1
Figure 6:
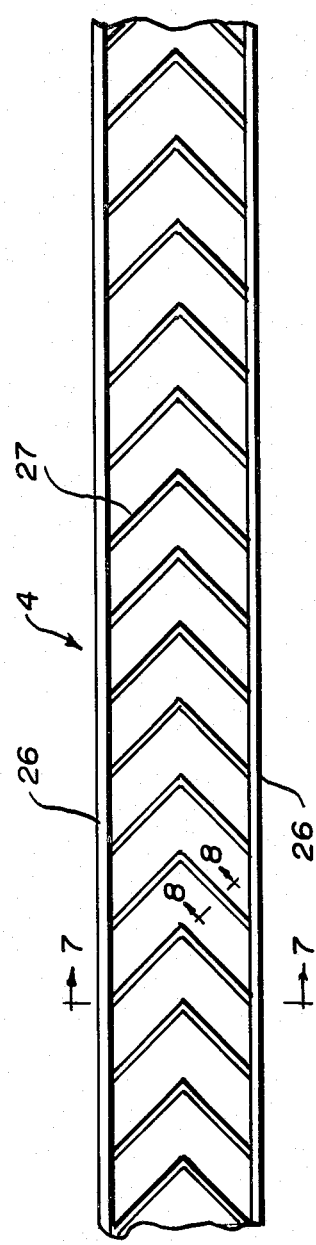
FIG. 6 is a partial plan view of the inner belt conveyor showing the raised edges and the cross cleats.
Figure 8:
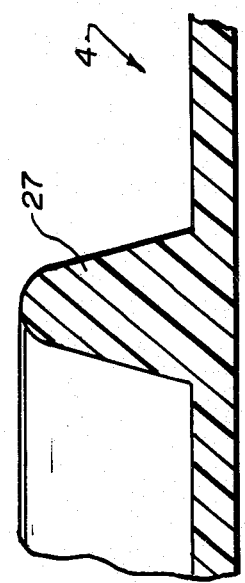
FIG. 8 is a sectional view taken in line 8—8 of FIG. 6.
Figure 7:
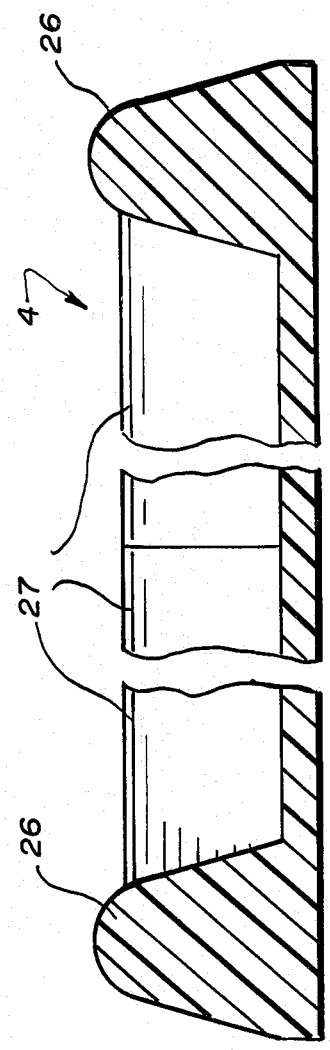
FIG. 7 is a sectional view taken on line 7—7 of FIG. 6.

In operation of the elevator, material discharged from the hopper 12 is conveyed by the entry portion 11 of the belt 3, which is supported in the troughed shape shown in FIG. 2. As the material enters the bight provided by the entry portion 21 of the belt 4, the latter closes down on the material as shown in FIG. 3, and is in full edge sealing engagement with the belt 3 for the remainder of the forward run, during which the belt 4 provides with the belt 3 a plurality of pockets retaining the material being elevated. The material is thus conveyed along a curved path to the higher level 2, from which is discharged onto a conveyor belt 24 which conveys it to the desired point at the higher level. The same apparatus may obviously be used as a lowering device for lowering material from the higher level to the lower level, if so desired.

We claim:

1. Apparatus for conveying loose bulk material from one level to a higher level, comprising inner and outer endless belt conveyors extending between respective pairs of supporting pulleys disposed at the respective levels and providing for each conveyor a forward run and a return run, and automatic tensioning means connected respectively to the belt conveyors for maintaining each belt conveyor in a state of tension; the forward run of said outer belt conveyor including an upwardly facing substantially horizontal entry portion, a downwardly facing upwardly inclined terminal portion, and a concavely curved intermediate portion; the forward run of said inner belt conveyor including a downwardly facing entry portion defining with a portion of said entry portion of said outer belt conveyor a bight between the conveyor belts to receive material therebetween and be elevated thereby, an upwardly facing, upwardly inclined terminal portion terminating at the higher level, and a convexly curved intermediate portion, said intermediate and terminal portions of the inner belt conveyor being carried by a support means, said inner belt conveyor having a stiffness greater than that of said outer belt conveyor; longitudinal raised edge portions on said inner belt in sealing engagement with the edges of said intermediate portion of said outer belt conveyor; and a plurality of raised cross cleats on said inner belt conveyor extending transversely between said raised edge portions, said cross cleats being of less height than said edge portions and herringbone in shape.

* * * * *